United States Patent
Huebner et al.

(10) Patent No.: US 9,327,629 B2
(45) Date of Patent: May 3, 2016

(54) TEMPORARY SEAT COVERS

(71) Applicant: Ford Global Technologies, LLC, Dearborn, MI (US)

(72) Inventors: Annette Lynn Huebner, White Lake, MI (US); Kristin Ann Hellman, Walled Lake, MI (US); Johnathan Andrew Line, Northville, MI (US); Matthew B. Rutman, Howell, MI (US); Lisa E. Petrauskas, Dexter, MI (US); Christian J. Hosbach, Allen Park, MI (US); Ryan Welch, Ottawa Lake, MI (US); Josh Greiner, Detroit, MI (US); Artur Sakarian, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/477,516

(22) Filed: Sep. 4, 2014

(65) Prior Publication Data

US 2016/0068089 A1 Mar. 10, 2016

(51) Int. Cl.
| | |
|---|---|
| *A47C 31/10* | (2006.01) |
| *A47C 31/11* | (2006.01) |
| *A47C 7/62* | (2006.01) |
| *B60N 2/60* | (2006.01) |

(52) U.S. Cl.
CPC ............ *B60N 2/6063* (2013.01); *B60N 2/60* (2013.01); *B60N 2/6027* (2013.01); *B60N 2/6036* (2013.01)

(58) Field of Classification Search
CPC ...... B60N 2/60; B60N 2/6027; B60N 2/6036; B60N 2/6063
USPC ............ 297/221, 228.1, 228.13, 229, 188.11, 297/188.13
See application file for complete search history.

(56) References Cited

U.S. PATENT DOCUMENTS

| | | | | |
|---|---|---|---|---|
| 1,051,566 | A * | 1/1913 | Dreher | 297/229 X |
| 1,985,222 | A * | 12/1934 | Menhall | 297/221 X |
| 2,804,914 | A * | 9/1957 | Butcko et al. | 297/229 |
| 4,600,238 | A * | 7/1986 | Goodford | 297/228.13 X |
| 5,330,251 | A * | 7/1994 | McGuire | 297/229 |
| 5,829,828 | A * | 11/1998 | Asfaw | A47C 31/11 297/228.1 X |
| 6,382,720 | B1 * | 5/2002 | Franklin et al. | 297/228.13 |
| 6,655,736 | B1 * | 12/2003 | Arenas | 297/229 |
| 6,659,551 | B1 * | 12/2003 | Arenas | B60N 2/6063 297/229 X |
| 7,210,738 | B1 * | 5/2007 | Mahaffy | 297/219.1 X |
| 7,488,036 | B2 * | 2/2009 | Tache | 297/228.13 |
| 7,686,392 | B2 | 3/2010 | Kenny | |
| 7,690,725 | B1 * | 4/2010 | Rawlings | 297/229 |
| 7,780,229 | B2 * | 8/2010 | Verhee | 297/188.13 X |
| 7,832,037 | B2 * | 11/2010 | Overton | 5/655 |
| 8,393,675 | B2 * | 3/2013 | Swanson | A47C 31/11 297/228.13 X |
| 8,500,198 | B2 | 8/2013 | Sugiura et al. | |
| 2015/0291071 | A1 * | 10/2015 | Thompson | B60N 2/6036 297/228.13 |

FOREIGN PATENT DOCUMENTS

WO 2008027810 A2 3/2008

* cited by examiner

*Primary Examiner* — Rodney B White
(74) *Attorney, Agent, or Firm* — Vichit Chea; Price Heneveld LLP

(57) ABSTRACT

A vehicle seat assembly includes a seat and a seatback pivotally coupled with the seat. A seatcover assembly is disposed below the seat. The seatcover assembly is operable between a stored position and a deployed position. A spring-biased spindle is coupled with an attachment end of the seatcover assembly. A seatcover is configured to be wrapped around the spindle in the stored position and withdrawn from the spring-biased spindle in the deployed position. An engagement rod is coupled with an intermediate portion of the seatcover and is configured to securely engage a biteline disposed between the seat and the seatback. A plurality of engagement features removably secure side edges of the seatcover with the seat.

18 Claims, 8 Drawing Sheets

TEMPORARY SEAT COVERS

FIELD OF THE DISCLOSURE

The present disclosure generally relates to seat covers for a vehicle, and more particularly to temporary seat cover a vehicle.

BACKGROUND OF THE DISCLOSURE

Vehicle seating assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE DISCLOSURE

According to one aspect of the present disclosure, a vehicle seat assembly includes a seat and a seatback pivotally coupled with the seat. A seat cover assembly is disposed below the seat. The seat cover assembly is operable between a stored position and a deployed position. A spring-biased spindle is coupled with an attachment end of the seat cover assembly. A seat cover configured to be wrapped around the spindle in the stored position and withdrawn from the spring-biased spindle in the deployed position. An engagement rod is coupled with an intermediate portion of the seat cover and is configured to securely engage a bite line disposed between the seat and the seatback. A plurality of engagement features removably secure side edges of the seat cover with the seat.

According to another aspect of the present disclosure, a vehicle seat assembly includes a seatback pivotally coupled with a seat. A seat cover assembly is disposed below the seat. A spindle is coupled with the seat cover assembly. A seat cover is wrapped around the spindle and is operable between a stored position and a deployed position. An engagement rod is disposed on the seat cover and engages a bite line between the seat and the seatback. Engagement features removably secure side edges of the seat cover with the seat.

According to yet another aspect of the present disclosure, a vehicle seat cover assembly includes a spindle coupled with a vehicle seat. A stretchable seat cover is configured to be wrapped around the spindle in a stored position and withdrawn from the spindle in a deployed position. An engagement rod is coupled with an intermediate portion of the seat cover and is configured to securely engage a bite line of the vehicle seat. Engagement features removably secure the seat cover with the vehicle seat.

According to yet another aspect of the present disclosure, a vehicle seat cover assembly includes a stretchable seat cover configured to extend over a top surface of a vehicle seat, as well as a front surface of a vehicle seatback. The stretchable seat cover is operable between a deployed position that sufficiently covers the top surface of the seat and the front surface of the seatback, and also a stored position, wherein the stretchable seat cover is secured below a front portion of the vehicle seat. It is contemplated that the stretchable seat cover may be wrapped around a spindle that is spring-biased to the stored position. The vehicle seat cover assembly is configured to protect the seat and the seatback when transporting items that can readily stain or otherwise damage the seat or the seatback.

According to yet still another aspect of the present disclosure, a vehicle seat cover assembly includes a spindle coupled with a vehicle seat. A stretchable seat cover is configured to be wrapped around the spindle in a stored position and withdrawn from the spindle and a deployed position. The vehicle seat cover assembly is designed to protect the upholstery of the vehicle seat and the seatback. The vehicle seat cover assembly can be used in conjunction with leather upholstery, as well as fabric upholstery. The various features of the vehicle seat cover assembly are configured to be stored in a position that is concealed by the seat and the seatback such that it is unseen by a passenger unless it is being used.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4A is an enlarged view of section IV of FIG. 4;

FIG. 6A is a top perspective view of the fastening system of FIG. 6; and

DETAILED DESCRIPTION OF THE EMBODIMENTS

Figure 1:
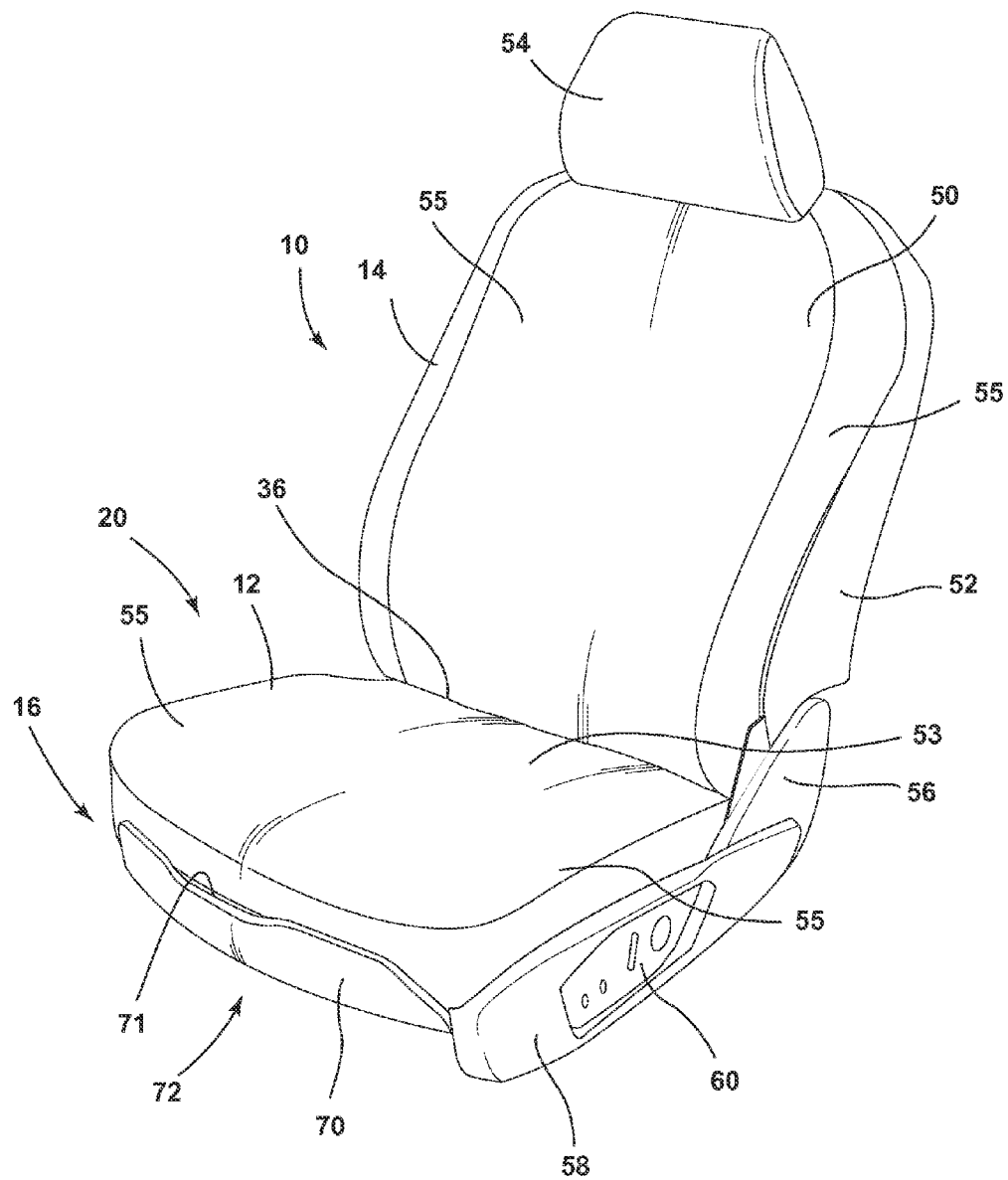
FIG. 1 is a front perspective view of one embodiment of a seat cover assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
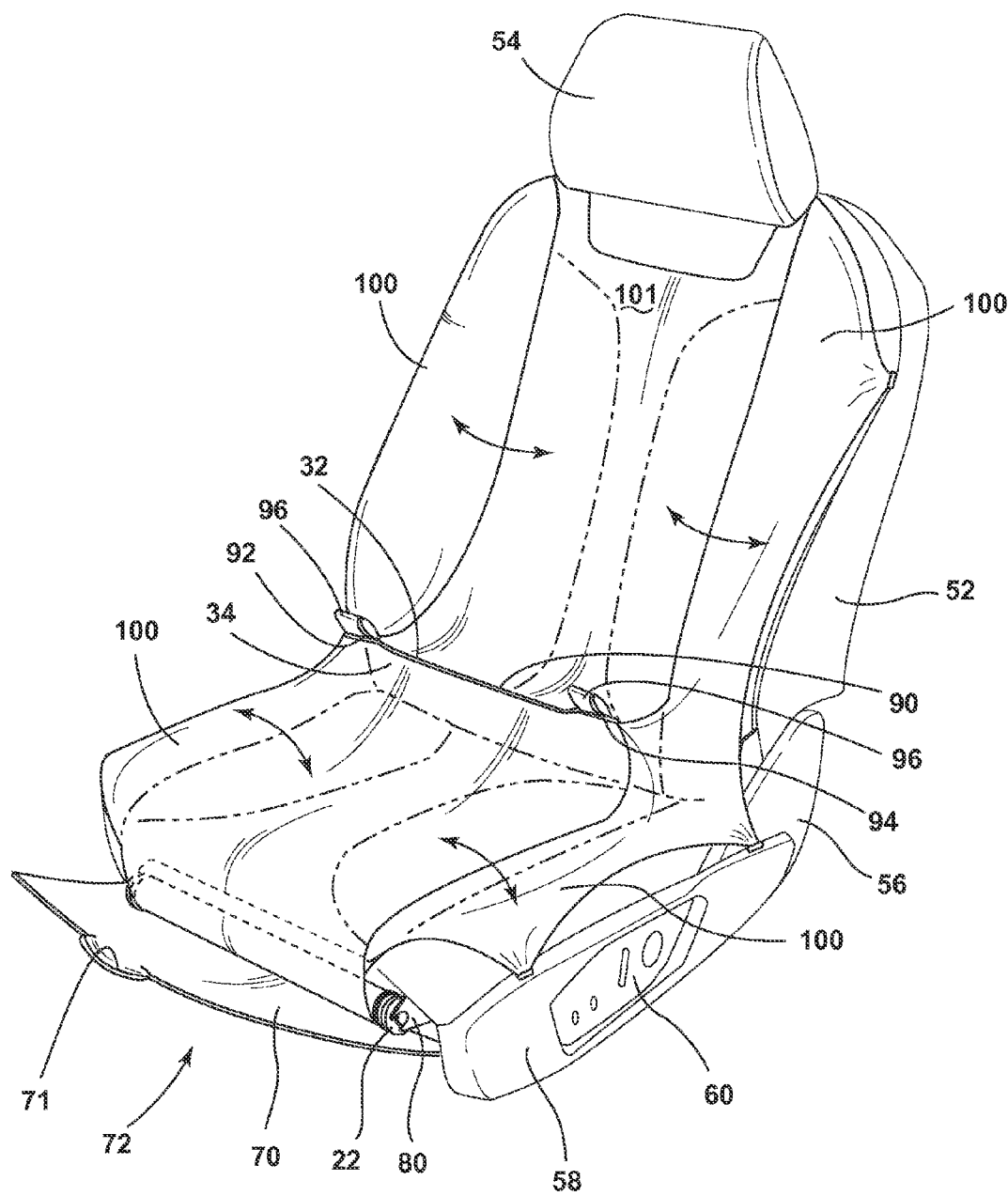
FIG. 2 is a front perspective view of the seat cover assembly of FIG. 1 after unfolding of the side bolster covers.
Figure 3:
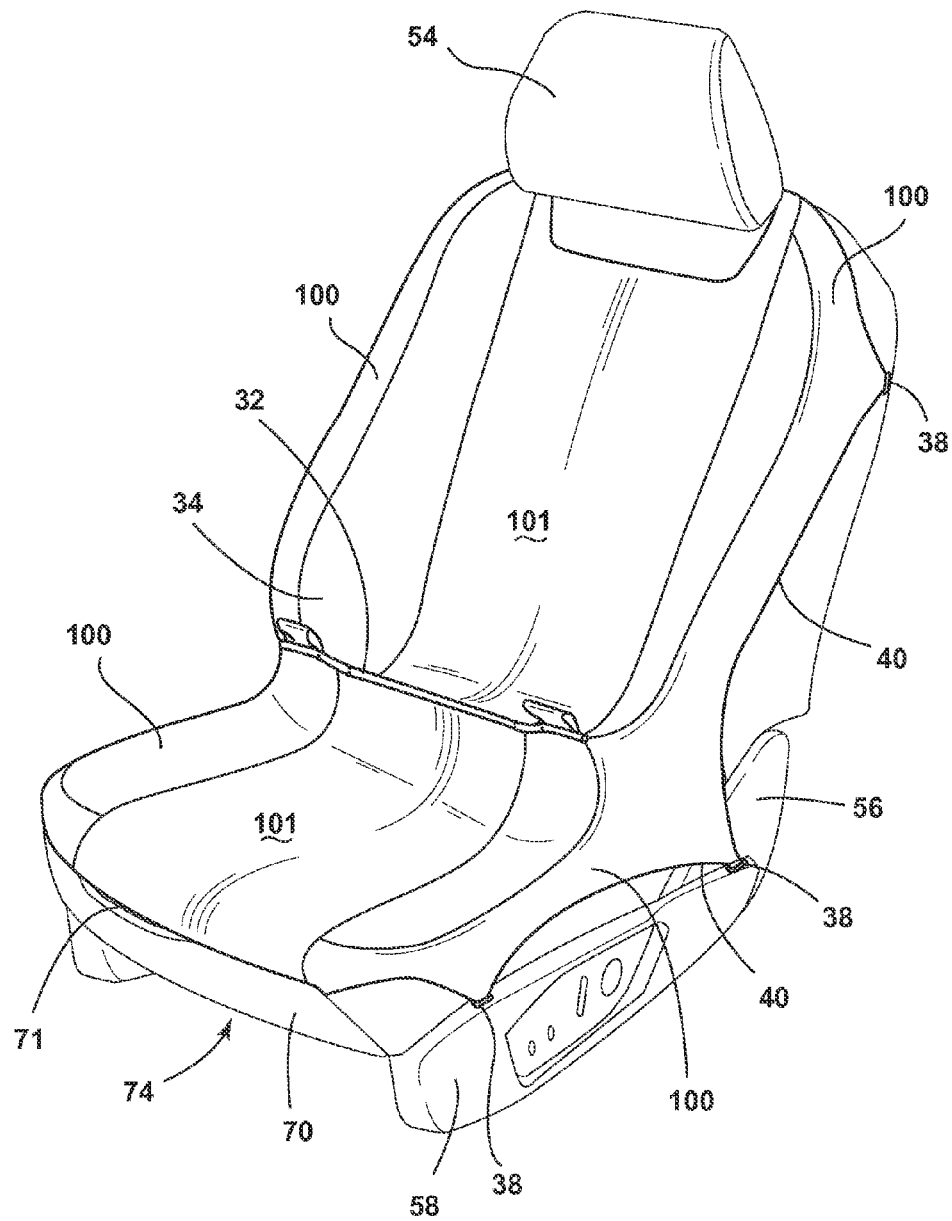
FIG. 3 is a front perspective view of the seat cover assembly of FIG. 1 before securing the engagement rod.

Referring to FIGS. 1-3, reference numeral 10 generally designates a vehicle seat assembly having a seat 12 and a seatback 14 pivotally coupled with the seat 12. A seat cover assembly 16 is disposed below the seat 12. The seat cover assembly 16 is operable between a stored position 18 and a deployed position 20. A spring-biased spindle 22 is coupled with an attachment end 24 of the seat cover assembly 16. A seat cover 30 is configured to be wrapped around the spindle 22 in the stored position 18 and withdrawn from the spindle 22 in the deployed position 20. An engagement rod 32 is coupled with an intermediate portion 34 of the seat cover and is configured to securely engage a bite line 36 disposed between the seat 12 and the seatback 14. A plurality of engagement features 38 removably secure side edges 40 of the seat cover 30 with the seat 12 and the seatback 14.

Figure 1A:
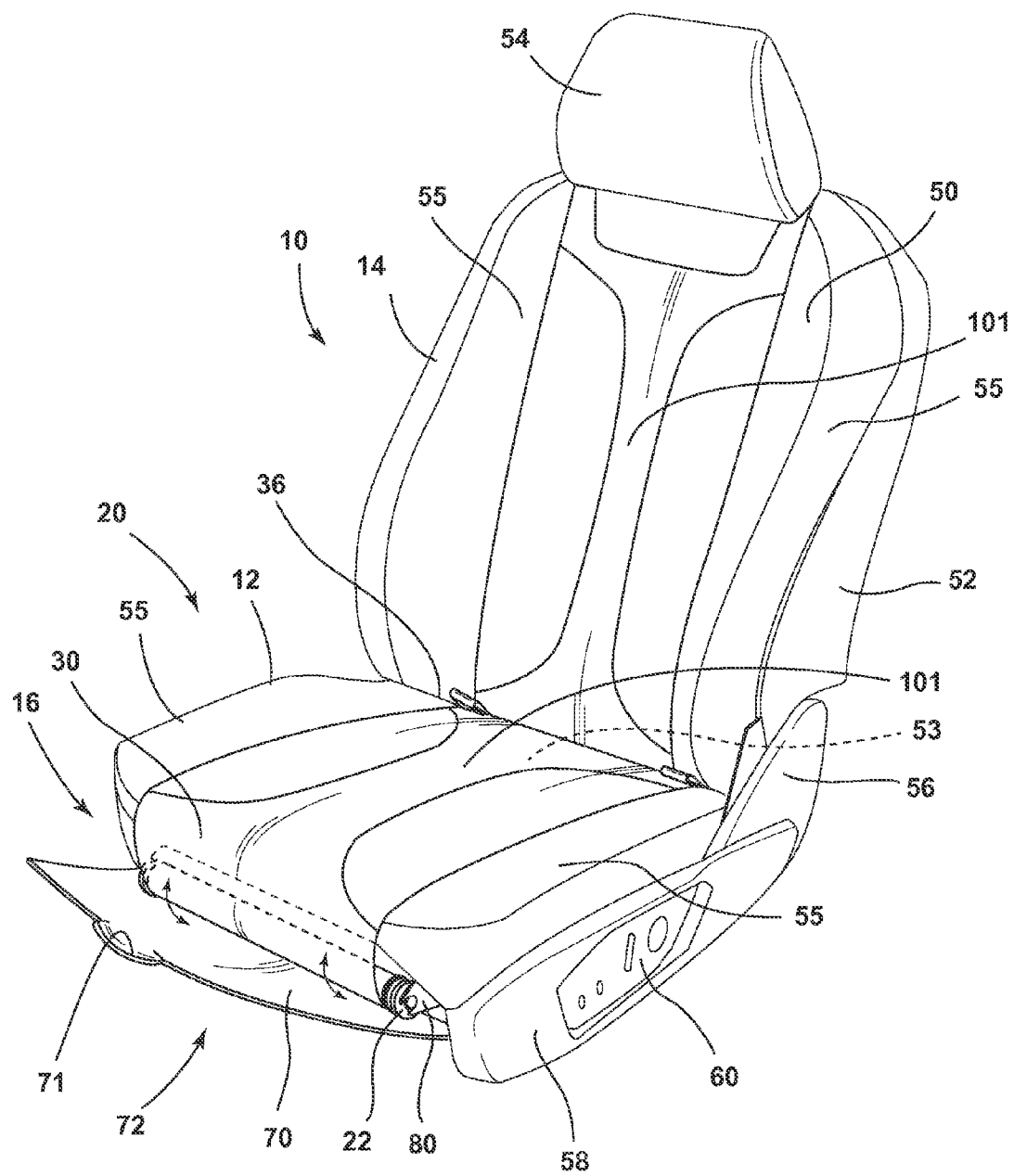
FIG. 1A is a front perspective view of the seat cover assembly of FIG. 1 during deployment.

With reference now to FIGS. 1 and 1A, the illustrated vehicle seating assembly 10 is configured for use in any of the driver side, passenger side, or rear seats of the vehicle. The seatback 14 includes a cushion assembly 50 and a hardback panel 52 supporting the cushion assembly. The seat 12 also includes a cushion assembly 53. The seatback 14 and seat 12 also each include side bolsters 55. In addition, a head restraint 54 is disposed above the seatback 14 and is configured to support the head of a passenger. Similarly, the seat 12 includes a frame support 56 with rigid sides 58 and may optionally include a control unit 60 to change the seating position or firmness of the seat 12, as well as the cushion assembly 50 disposed on the frame support 56 configured to support the weight of a passenger. A free end of the seat cover 30 may include an enlarged slot for accommodating the head restraint 54 disposed on the seatback 14.

With reference again to FIGS. 1 and 1A, the illustrated vehicle seating assembly 10 includes a variety of features designed to aid in the comfort of a seated passenger. The control unit 60 may include various controls to aid in reclining the seatback 14, providing upper back or lower back support, adjusting the height of the vehicle seating assembly 10 in the vehicle, etc. In addition, in the illustrated embodiment, a forward portion of the seat 12 includes a door 70 that is operable between an open position 72 (FIG. 1A) and a closed position 74 (FIG. 3). The door 70 is configured to cover a cavity disposed under a seat cushion of the seat 12. The cavity includes the spring-biased spindle 22. The spring-biased spindle 22 is supported on forward extending members 80. The spring-biased spindle 22 extends between the forward extending members 80 and is rotationally coupled thereto. It is contemplated that the spindle 22 may be spring-biased or include a gear assembly operably coupled with a motor that is configured to move the seat cover 30 between the deployed position 20 and the stored position 18. The door 70 is movable between the open position 72 and the closed position 74, regardless of the relative placement of the seat cover 30. Stated differently, the door 70 may be opened and closed when the seat cover 30 is in the stored position 18 and also may be opened or closed when the seat cover 30 is in the deployed position 20.

Figure 4:
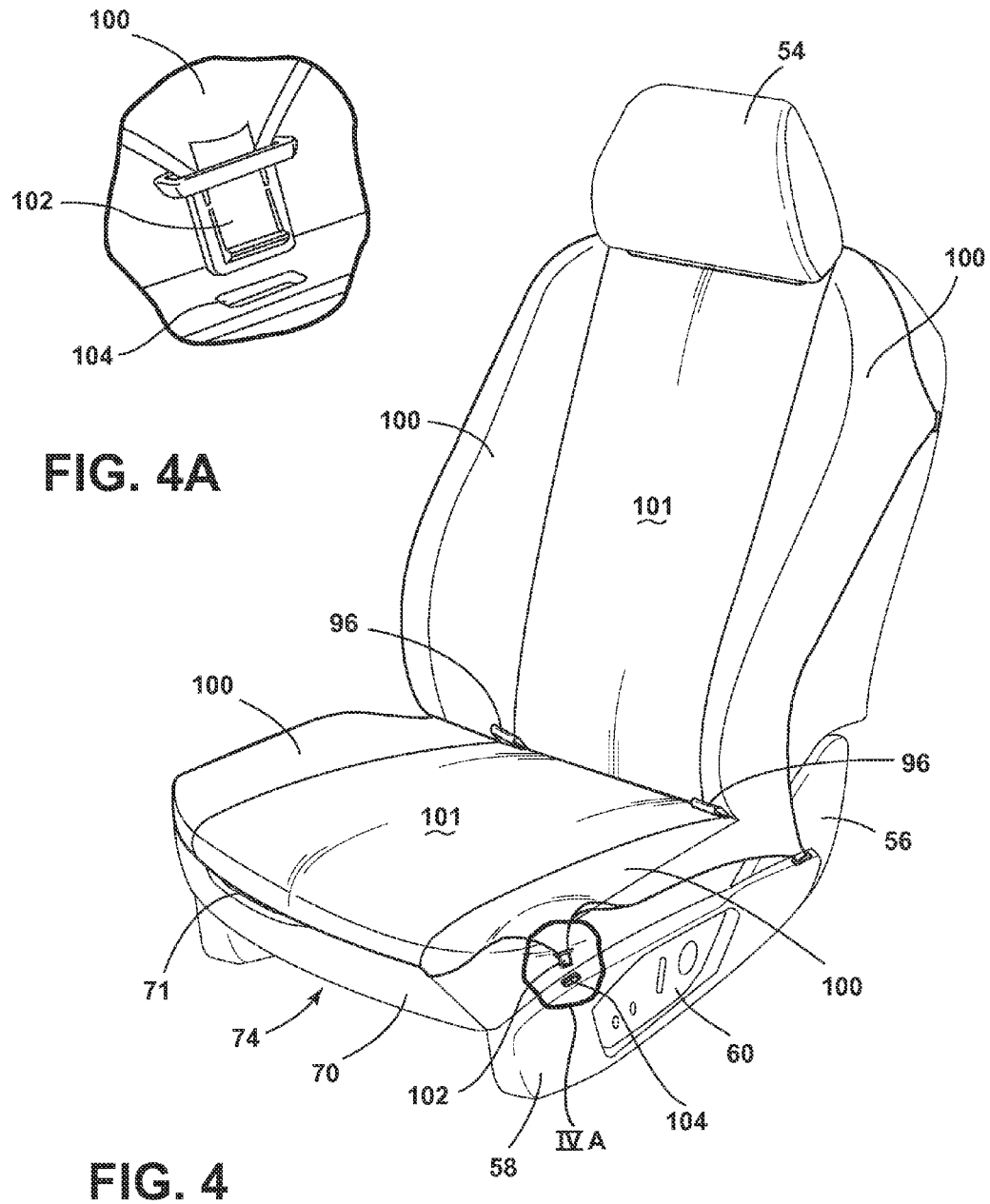
FIG. 4 is a front perspective view of the seat cover assembly of FIG. 1 with snap-fit connectors.
Figure 5:
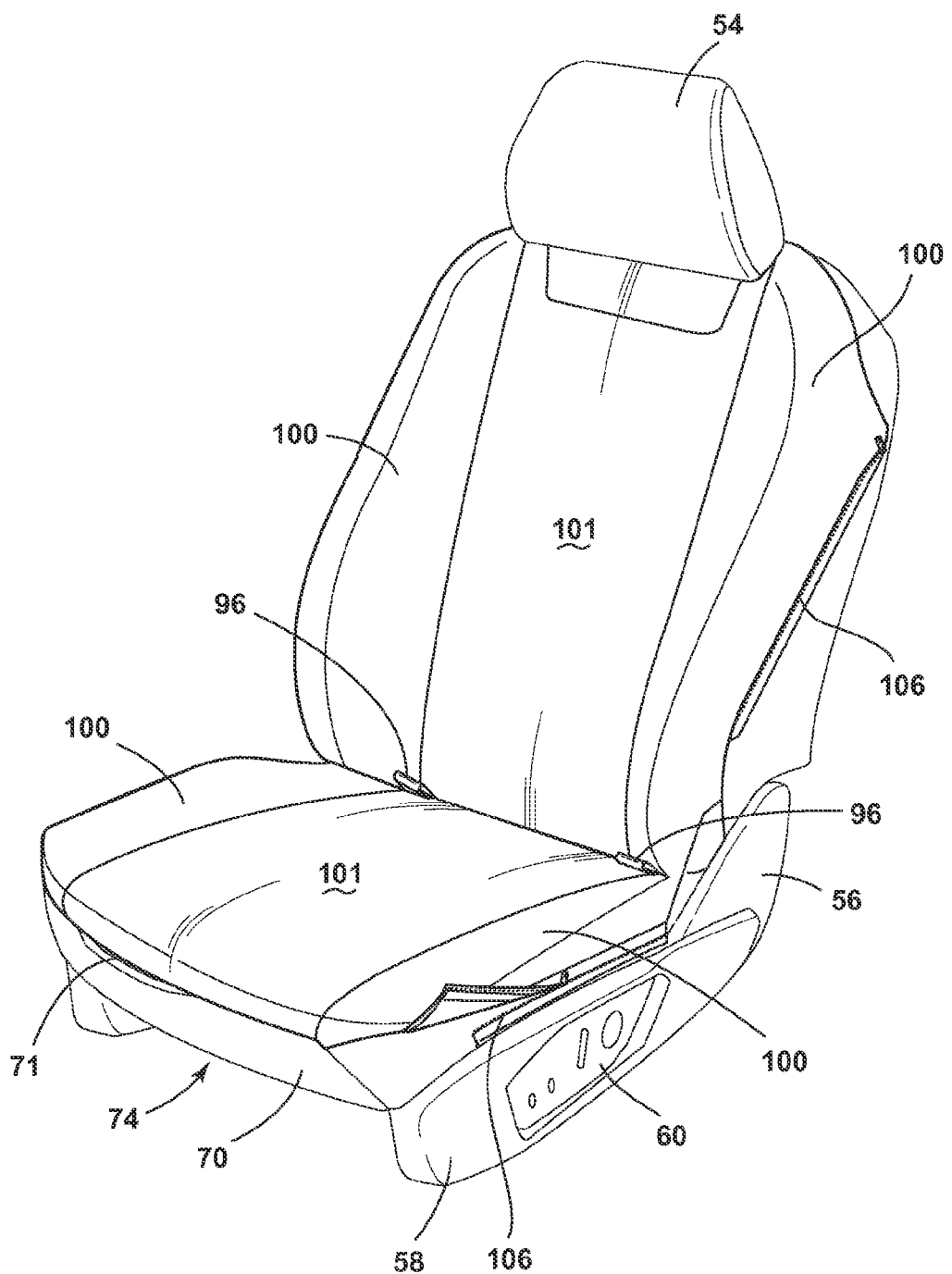
FIG. 5 is an enlarged view of section IV of FIG. 4 with zipper connectors.
Figure 6:
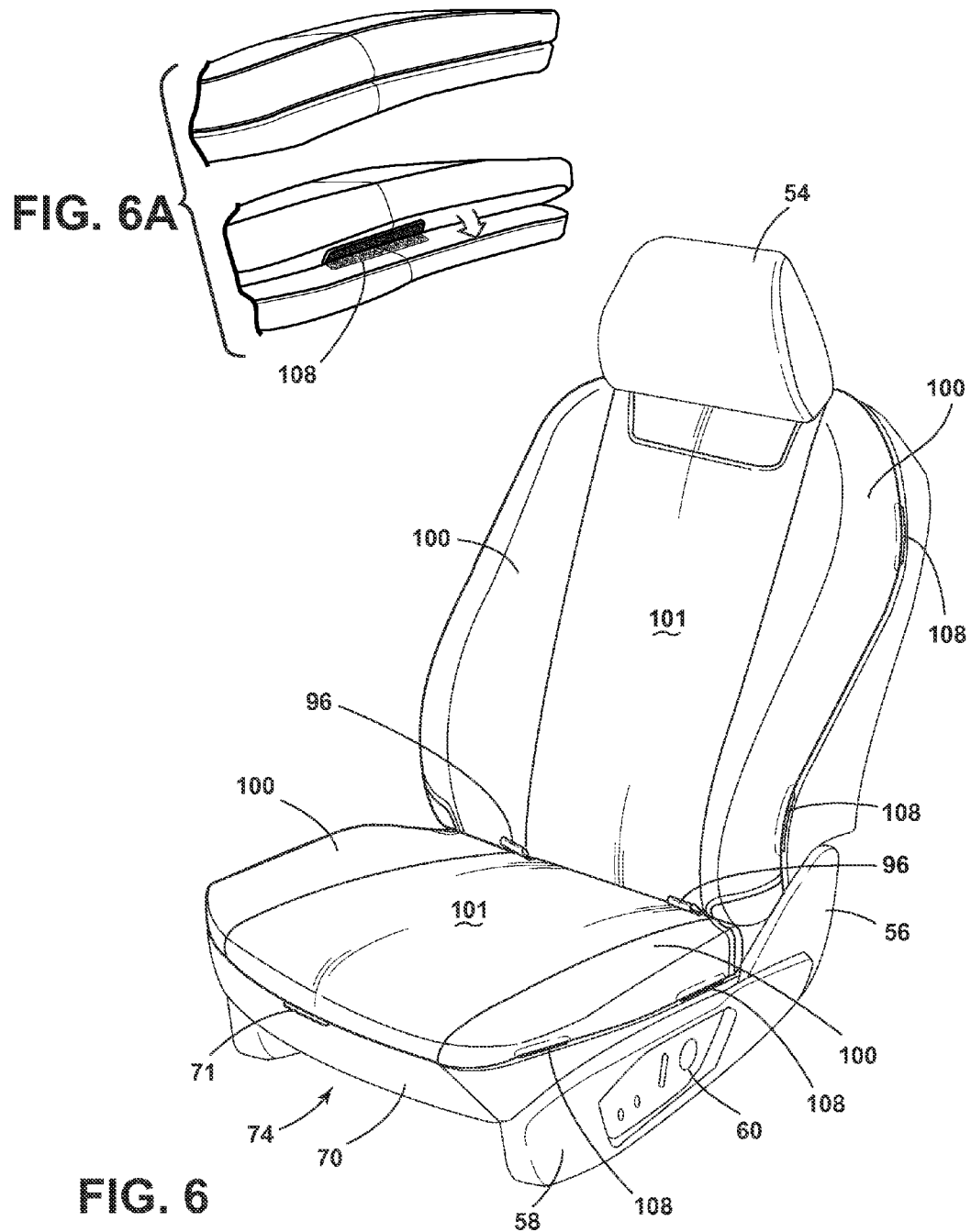
FIG. 6 is an enlarged view of section IV of FIG. 4 with hook-and-loop fasteners.

In use, the seat cover 30 can be withdrawn from the spindle 22. The engagement rod 32 is coupled with the intermediate portion 34 of the seat cover 30 and is configured to wrap around the spindle 22 with the seat cover 30 when in the stored position 18. The engagement rod 32, as previously noted, is also configured to securely engage the bite line 36 between the seat 12 and the seatback 14. In the illustrated embodiment, the engagement rod 32 includes a central portion 90 disposed between first and second offset portions 92, 94 on either side of the central portion. The first and second offset portions are adjacent to pull tabs 96 that are designed to assist a passenger in withdrawing the engagement rod 32 from the bite line 36 between the seat 12 and the seatback 14. As seen in FIG. 2, the seat cover 30 includes outwardly extending side bolster covers 100 that are configured to be folded under a body portion 101 of the seat cover 30. Accordingly, the entirety of the seat cover 30 can be wrapped around the spindle 30 when moved to the stored position 18. When the outwardly extending side bolster covers 100 are withdrawn laterally, the outwardly extending side bolster covers 100 extend over side bolsters of the seat 12 and the seatback 14. The plurality of engagement features 38 are disposed on side areas of the seat 12 and the seatback 14. The plurality of engagement features 38 are configured to securely engage the seat cover 30 with the seat 12 and the seatback 14. The plurality of engagement features 38 may be any of a variety of attachment devices, including zippers 106 (FIG. 5), hook-and-loop fastener arrangements 108 (FIG. 6), snap-fit fasteners, etc. As illustrated in the embodiment of FIG. 4, the plurality of engagement features 38 include an engagement clip 102 configured to engage a receiving aperture 104 on the seat 12 and the seatback 14. Once engaged, the seat cover 30 is sufficiently secured to the seat 12 and the seatback 14. The engagement rod 32 is then securely positioned between the seat 12 and the seatback 14 and the bite line 36. Accordingly, the engagement rod 32 is not viewable to a passenger when positioned in the bite line 36. Thus, a seated passenger would not feel the engagement rod 32 and find it uncomfortable.

Figure 7:
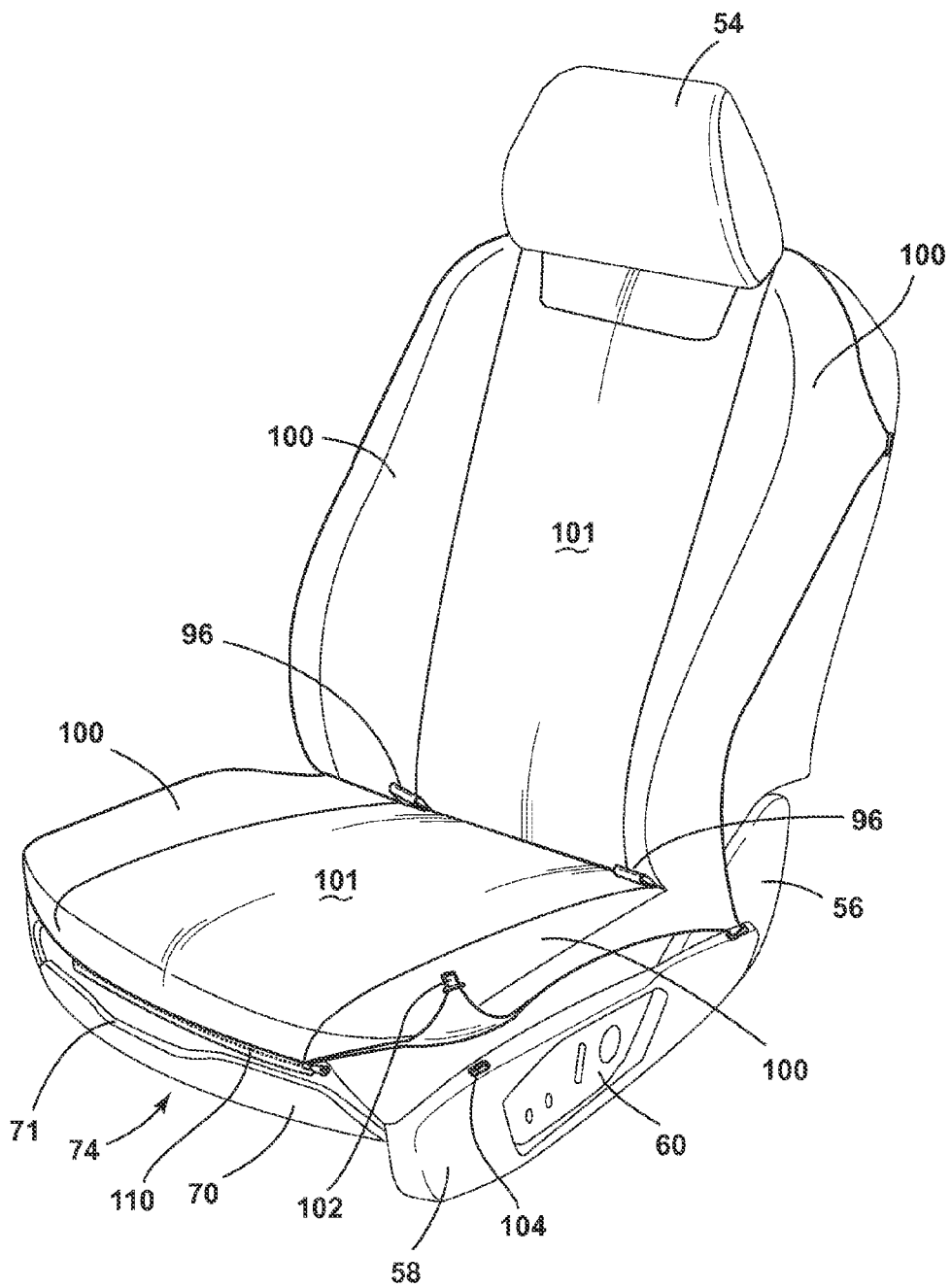
FIG. 7 is a top perspective view of a removable seat cover.

With reference to FIG. 7, as previously noted, the door 70 is operable between the open and closed positions 72, 74 and configured to cover the spindle 22 and conceal the spindle 22 from view. The door includes a handle 71. It is also contemplated that the seat cover 30 may be connected with the spindle 22 via a zipper arrangement 110. That is, in the event that the seat cover 30 becomes filthy and needs to be cleaned, or is otherwise damaged or in need of repair, the seat cover 30 can be unzipped from the spindle 22 and removed from the spindle 22. Thereafter, the spindle 22 can be reattached via the zipper arrangement to the spindle 22. Alternatively, a new seat cover 30 may be attached via the zipper arrangement with the spindle 22.

When a passenger is using the seat cover 30, the passenger opens the trim door below the seat 12 and withdraws the seat cover 30 from the stored position 18. When fully unrolled, the outwardly extending side bolster covers 100 can be withdrawn or unfolded from the body portion 101 of the seat cover 30. The seat cover 30 is then placed on the seating surfaces of the seat 12 and the seatback 14. The seat cover 30 is then secured via the plurality of engagement features 38 on the sides of the seat 12 and the seatback 14, and at the same time, the engagement rod 32 is engaged with the bite line 36 of the seat 12. It is also contemplated that the passenger can use the seat cover 30 without forcing the engagement rod 32 into the bite line 36 of the seat 12. In this instance, the seat cover 30 is suspended above the seat 12 and the seatback 14, which can protect the seatback 14 from the hot sun, for example, while allowing substantial air circulation between the seat cover 30 and the seat 12 and the seatback 14.

In the event the passenger desires to stow the seat cover 30, the passenger first releases the plurality of engagement features 38 on the side of the seat 12 and the seatback 14. The outwardly extending side bolster covers are then folded under the body portion of the seat cover 30 and the pull tabs are used to pull the engagement rod 32 from the bite line 36. The spindle 22 can then be used to draw the seat cover 30 back to the stored position 18. The spindle 22 may accomplish this via a spring-bias on a cylinder, a gear and motor assembly operably coupled with the spindle 22, or any other arrangement that sufficiently rotates the spindle 22 to store the seat cover 30 on the spindle 22.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seat assembly comprising:
    a seat;
    a seatback pivotally coupled with the seat;
    a seat cover assembly disposed below the seat, the seat cover assembly being operable between a stored position and a deployed position and comprising:
        a spring-biased spindle coupled with an attachment end of the seat cover assembly;
        a seat cover configured to be wrapped around the spindle in the stored position and withdrawn from the spring-biased spindle in the deployed position; and
        an engagement rod coupled with an intermediate portion of the seat cover, the engagement rod being configured to extend across and securely engage a bite line disposed between the seat and the seatback;
    a plurality of engagement features removably securing side edges of the seat cover with the seat; and
    a forward portion of the seat including a door horizontally hinged to the forward portion of the seat, the door configured to cover a cavity disposed under a seat cushion of the seat and containing the spring-biased spindle, the door operable between open and closed positions to avail the seat cover for use and conceal the seat cover, respectively.

2. The vehicle seat assembly of claim 1, wherein the seat cover includes outwardly extending side bolster covers.

3. The vehicle seat assembly of claim 1, wherein the engagement features include one of a hook-and-loop fastener arrangement, snap-fit fasteners, and zippers.

4. The vehicle seat assembly of claim 1, further comprising:
    a trim door operable between open and closed positions and configured to generally conceal the seat cover assembly from view in the closed position.

5. The vehicle seat assembly of claim 1, wherein the engagement rod includes pull tabs configured to assist a passenger in withdrawing the engagement rod from the bite line.

6. The vehicle seat assembly of claim 1, wherein a zipper removably couples the seat cover assembly with the seat.

7. The vehicle seat assembly of claim 1, wherein a free end of the seat cover includes an enlarged slot for accommodating a head restraint disposed on the seatback.

8. A vehicle seat assembly comprising:
    a seatback pivotally coupled with a seat and defining a bite line;
    a seat cover assembly disposed below the seat and comprising:
        a seat cover wrapped around a spindle coupled with the seat and operable between stored and deployed positions;
        an engagement rod on the seat cover extending across the seat and engaged with the bite line, wherein the engagement rod includes pull tabs configured to assist a passenger in withdrawing the engagement rod from the bite line; and
    engagement features securing edges of the seat cover with the seat.

9. The vehicle seat assembly of claim 8, wherein the seat cover includes outwardly extending side bolster covers.

10. The vehicle seat assembly of claim 8, wherein the engagement features include one of a hook-and-loop fastener arrangement, snap-fit fasteners, and zippers.

11. The vehicle seat assembly of claim 8, further comprising:
    a forward portion of the seat including a trim door horizontally hinged to the forward portion of the seat, the trim door configured to cover a cavity disposed under a seat cushion of the seat and containing the spindle, the trim door operable between open and closed positions and configured to generally conceal the seat cover assembly from view in the closed position.

12. The vehicle seat assembly of claim 8, wherein a zipper removably couples the seat cover assembly with the seat.

13. The vehicle seat assembly of claim 8, wherein a free end of the seat cover includes an enlarged slot for accommodating a head restraint disposed on the seatback.

14. A vehicle seat cover assembly comprising:
    a spindle coupled with a seat;
    a stretchable seat cover configured to be wrapped around the spindle in a stored position and withdrawn from the spindle in a deployed position; and
    an engagement rod coupled with an intermediate portion of the seat cover and configured to extend across and securely engage a bite line of the seat, wherein the engagement rod includes pull tabs configured to assist a passenger in withdrawing the engagement rod from, the bite line; and engagement features removably securing the seat cover with the seat.

15. The vehicle seat cover assembly of claim 14, wherein the engagement features include one of a hook-and-loop fastener arrangement, snap-fit fasteners, and zippers.

16. The vehicle seat cover assembly of claim 14, further comprising:

a forward portion of the seat including a trim door horizontally hinged to the forward portion of the seat, the trim door configured to cover a cavity disposed under a seat cushion of the seat containing the spindle, the trim door operable between open and closed positions and configured to generally conceal the seat cover assembly from view in the closed position.

17. The vehicle seat cover assembly of claim 14, wherein a zipper removably couples the seat cover assembly with the seat.

18. The vehicle seat cover assembly of claim 14, wherein a free end of the seat cover includes an enlarged slot for accommodating a head restraint disposed on a seatback.

* * * * *